United States Patent [19]
Schryer

[11] Patent Number: 5,242,744
[45] Date of Patent: Sep. 7, 1993

[54] SILICONE FLAME RETARDANTS FOR THERMOPLASTICS

[75] Inventor: Kimberlie A. Schryer, Clifton Park, N.Y.

[73] Assignee: General Electric Company, Waterford, N.Y.

[21] Appl. No.: 774,669

[22] Filed: Oct. 11, 1991

[51] Int. Cl.$^5$ .................. D03D 25/00; C08K 9/06
[52] U.S. Cl. .................. 428/224; 523/210; 524/436; 524/506; 525/106
[58] Field of Search ............. 525/106; 524/436, 506; 523/210; 428/224

[56] References Cited

U.S. PATENT DOCUMENTS

| | | | |
|---|---|---|---|
| 3,711,520 | 1/1973 | Pfeifer | 260/375 B |
| 4,123,586 | 10/1978 | Betts et al. | 428/391 |
| 4,273,691 | 1/1981 | MacLaury et al. | 260/23 S |
| 4,288,360 | 9/1981 | Bobear | 260/37 SB |
| 4,387,176 | 6/1983 | Frye | 524/268 |
| 4,496,680 | 1/1985 | Ashby | 524/265 |
| 4,533,687 | 8/1985 | Itoh et al. | 524/506 |
| 4,536,529 | 8/1985 | Frye et al. | 524/284 |
| 4,769,275 | 9/1988 | Inagaki et al. | 428/240 |
| 4,871,795 | 10/1989 | Pawar | 524/267 |
| 5,104,920 | 4/1992 | Keogh | 524/436 |

FOREIGN PATENT DOCUMENTS 2167339 7/1987 Japan .

Primary Examiner—Melvyn I. Marquis
Assistant Examiner—Karen A. Dean

[57] ABSTRACT

There are provided flame retardant thermoplastic additives effective for rendering normally flammable thermoplastic resins flame retardant. The additives generally comprise a silicone oil, a silicone resin soluble in the silicone oil and magnesium hydroxide.

36 Claims, 2 Drawing Sheets

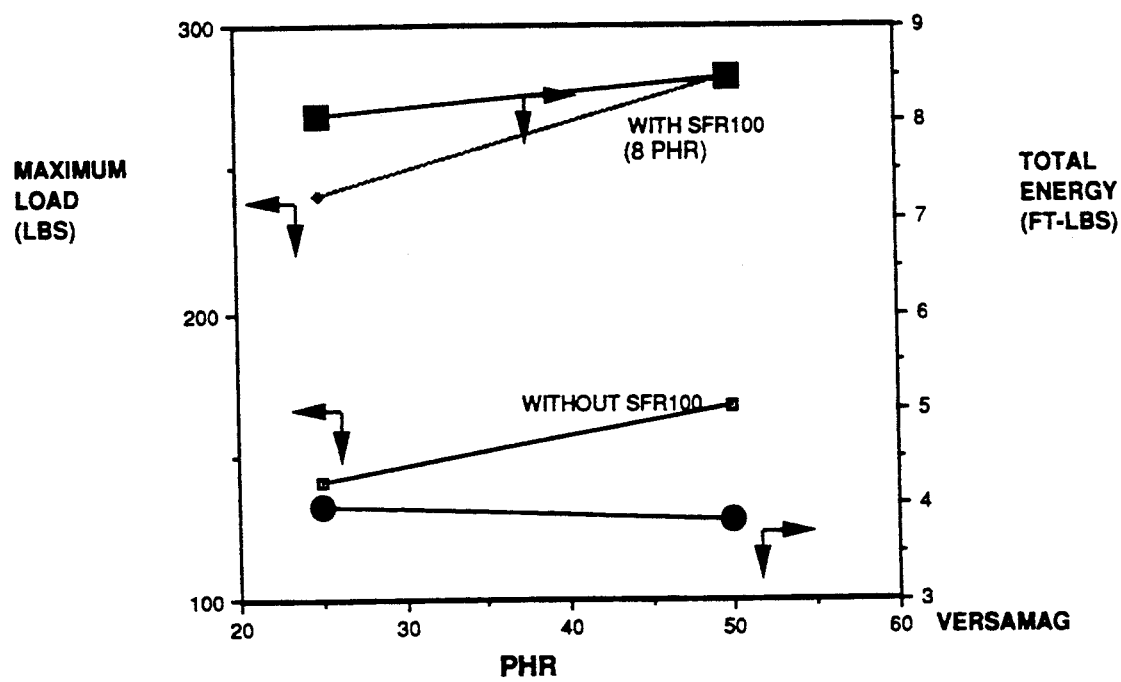

SILICONE FLAME RETARDANTS FOR THERMOPLASTICS

The present invention relates to flame retardant compositions and particularly flame retardant thermoplastics such as polyolefins and others. More particularly the present invention relates to combining thermoplastic resins with silicone treated magnesium hydroxide.

BACKGROUND OF THE INVENTION

There have been numerous attempts in the prior art to provide flame retardant thermoplastics. Typically it has been necessary to heavily fill the plastic or thermoplastic material with additives until the desired degree of flame retardancy had been achieved. However, this offered several disadvantages insofar as a large proportion of additives could normally be expected to detract from the physical properties of the plastic base. Furthermore, it was not unusual to find in a single system large quantities of halogen-containing materials as well as metal compounds.

It will be seen that the present invention provides improved flame retardant compounds which not only improve both flame retardancy and physical properties, but also avoid the necessity for utilizing organic halides and certain metal compounds such as antimony oxide, which may be undesirable in certain applications.

In Frye, U.S. Pat. No. 4,387,176, there is disclosed flame retardant compositions comprising 50 to 97 percent by weight of thermoplastic, 1 to 40 percent by weight of a silicone base, 1 to 20 percent by weight of a metal organic compound and 1 to 20 percent by weight of a silicone resin such as MQ resin which is soluble in the silicone base.

In Ashby, U.S. Pat. No. 4,496,680, there are disclosed flame retardant nylons comprising 50–90 percent by weight nylon and 10–50 percent by weight of a flame retardant additive comprising 20 to 75 percent by weight of low molecular weight siloxanediols wherein all the organo groups bonded to silicon are phenyl, 3 to 30 percent by weight Group IIA metal $C_6$–$C_{20}$ carboxylic acid salt, 10 to 60 percent by weight aluminum trihydrate and 10 to 50 percent by weight of an organohalide.

In Pawar, U.S. Pat. No. 4,871,795, there is disclosed silicone based flame retardants for thermoplastics which comprise (A) 100 parts by weight of a thermoplastic resin and (B) from about 2 to about 30 parts by weight of a flame retardant additive comprising (i) 20 to 60 percent by weight of a silicone oil, (ii) 10 to 40 percent by weight of a silicone resin and (iii) 5 to 60 percent by weight of a phosphorous and nitrogen containing gassing agent.

In MacLaury et al., U.S. Pat. No. 4,273,691, there is described a flame retardant composition of 70 to 98 percent by weight organic polymer, 1 to 10 percent by weight of silicone and 1 to 20 percent by weight of Group IIA metal $C_{(6-20)}$ carboxylic acid salt.

In Betts et al., U.S. Pat. No. 4,123,586, there is disclosed preparing flame resistant crosslinked polyolefins by adding thereto a decabromyldiphenyl ether, silicone gum and dibasic lead phthalate.

Also to be mentioned is Frye et al., U.S. Pat. No. 4,536,529, wherein the patentees teach that small amounts of magnesium hydroxide can be used with stearic acids as a reactive precursor to certain metal soaps, which are then added to certain silicone resins and silicone fluids to produce a flame retardant additive for thermoplastic resins.

Thus, it can be seen that none of the prior art disclosures teach or suggest a flame retardant additive comprising silicone treated magnesium hydroxide which is surprisingly effective in improving physical properties in addition to flame retardancy. Accordingly, the claimed compositions satisfy a long felt need in the art for a flame retardant agent which is effective at improving both the flame retardancy and physical properties of thermoplastic resins. Applicants have now found that by adding high loadings of silicone treated magnesium hydroxide to thermoplastic resins there is provided a composition which not only has improved flame resistance, but also unexpectedly has improved physical properties.

SUMMARY OF THE INVENTION

According to the present invention there is provided a flame retardant additive comprising (a) from about 2 to about 40 percent by weight of a silicone; (b) from about 1 to about 20 percent by weight of a silicone resin soluble in the silicone (a); and (c) from about 40 to about 96 percent by weight of magnesium hydroxide. Preferably the silicone is an essentially linear polydimethylsiloxane copolymer having a viscosity of 90,000 to 150,000 at 25° C.; and the silicone resin is an MQ silicone resin comprised of monofunctional M units of the average formula $R_3SiO_{0.5}$ and tetrafunctional Q units of the average formula $SiO_2$, and having an average ratio of, approximately, 0.3 to 4.0M units per Q unit. In a preferred embodiment of the present invention, the compositions of the present invention further comprise (d) from about 1 to about 10 percent by weight of a Group IIA metal organic salt. The preferred Group IIA metal organic salt is magnesium stearate.

Preferably, the silicone (a) is present in an amount ranging from about 2 to about 20 percent by weight based on the weight of the additive composition; the silicone resin (b) is present in an amount ranging from about 1 to about 10 percent by weight based on the weight of the additive composition; the magnesium hydroxide (c) is present in an amount ranging from about 70 to about 96 percent by weight based on the weight of the additive composition.

The present invention also provides flame retardant compositions comprising (A) from about 30 to about 90 percent by weight of a normally flammable thermoplastic resin based on the weight of the total composition; and (B) from about 70 to about 10 percent by weight of a flame retardant additive based on the weight of the total composition comprising: (a) from about 2 to about 40 percent by weight of a silicone based on the weight of the flame retardant additive (B); (b) from about 1 to about 20 percent by weight of a silicone resin soluble in the silicone (a) based on the weight of the flame retardant additive (B); and (c) from about 40 to about 96 percent by weight of magnesium hydroxide based on the weight of the flame retardant additive (B). The preferred thermoplastic resin (A) is polypropylene.

Preferably, the flame retardant compositions of the present invention comprise (A) from about 45 to about 85 percent by weight, of a normally flammable thermoplastic resin based on the weight of the total composition; and from about 55 to about 15 percent by weight based on the weight of the total composition of a flame retardant additive comprising (a) from about 2 to about 20 percent by weight based on the weight of the flame retardant additive of a silicone; (b) from about 1 to about 10 percent by weight based on the weight of the flame retardant additive (B) of a silicone resin; and (c) from about 70 to about 96 percent by weight based on the weight of the flame retardant additive (B) of magnesium hydroxide.

Further, according to the present invention, there is provided a method for preparing flame retardant thermoplastic resins having improved impact strength. Also the present invention provides flame retardant articles of manufacture made from the flame retardant compositions of the present invention.

BRIEF DESCRIPTION OF THE DRAWINGS

FIGS. 1 and 2 show the significant improvements in the physical properties of the compositions of the present invention in graphic form.

DETAILED DESCRIPTION OF THE PRESENT INVENTION

Figure 1:
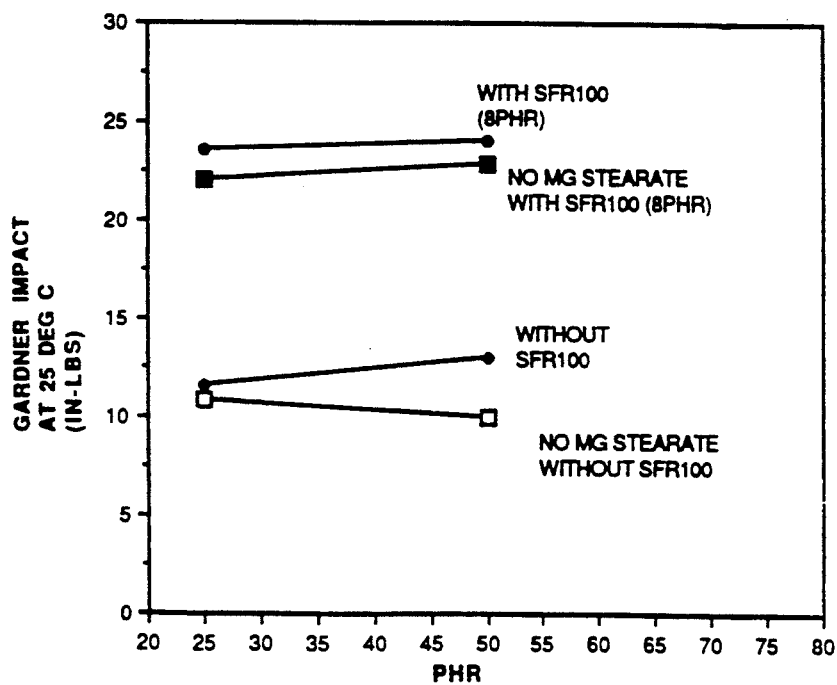

The present invention provides an additive formulation capable of improving the flame retardant properties of thermoplastics. The invention is also directed to novel flame retardant thermoplastic compositions and methods for forming the novel flame retardant thermoplastic compositions of the present invention.

Component (a) of the flame retardant additive of the present invention are silicones. The term "silicone" as used herein is generic for a wide range of polysiloxane materials which can advantageously be utilized in the compositions of the present invention. For purposes of the instant specification it is intended that the expression "silicone" be construed as including those effective silicone materials as described by MacLaury and Holub in U.S. Pat. No. 4,273,691 as well as other effective silicone materials, several of which will be described below. Typically effective silicone materials will be those silicone fluids or gums which are organopolysiloxane polymers comprised of chemically combined siloxy units typically selected from the group consisting of $R_3SiO_{0.5}$, $R_2SiO$, $R^1SiO_{1.5}$, $R^1R_2SiO_{0.5}$, $RR^1SiO$, $(R^1)_2SiO$, $RSiO_{1.5}$ and $SiO_2$ units and mixtures thereof wherein each R represents independently a saturated or unsaturated monovalent hydrocarbon radical, $R^1$ represents a radical such as R or a radical selected from the group consisting of a hydrogen atom, hydroxyl, alkoxy, aryl, vinyl, or allyl radicals etc. and wherein said organopolysiloxane has a viscosity or approximately 600 to 300,000,000 centipoise at 25° C. A preferred silicone material is a polydimethylsiloxane having a viscosity of approximately 90,000 to 150,000 centipoise at 25° C. Such effective silicone materials can be collectively referred to as silicone oils. Such silicone oils are readily available under a wide variety of brand and grade designations.

The flame retardant additive compositions of the present invention preferably comprise from about 2 to about 40 percent by weight of the silicone (a) and more preferably from about 2 to about 20 percent by weight of the silicone (a) based on the total weight of the flame retardant additive composition.

Component (b) of the flame retardant additive compositions of the present invention are silicone resins. Silicone resins are well known materials coming in a variety of forms. Among the preferred silicone resins are MQ silicone resins. The expression "MQ silicone resin" refers to the fact that such resins are typically comprised primarily of monofunctional M units of the formula $R_3SiO_{0.5}$ and tetrafunctional Q units of the average formula $SiO_2$ having a specified ratio of M to Q units. A notably effective silicone resin for use in the present invention is polytrimethylsilylsilicate which can have a ratio of, approximately, 0.3 to 4.0M units per Q unit. An example of a commercially available silicone oil (a) and MQ silicone resin (b) at a 2:1 ratio is SFR 100 additive, a product of General Electric Company.

It is contemplated that other silicone oil soluble forms of solid silicone resins may be effective for use in the flame retardant compositions of the present invention. Indeed, MT and TQ silicone resins (where T represents trifunctional $RSiO_{1.5}$ units) may also be effective as well as mixtures and copolymers of each of the resins mentioned. These silicone resins are well known materials and are readily available. A criteria for suitability is that such effective silicone resinous materials be soluble or dispersible in the silicone oil base.

The flame retardant additive compositions of the present invention preferably comprise from about 1 to about 20 percent by weight of the silicone resin (b), and more preferably from about 1 to about 10 percent by weight of the silicone resin (b) based on the total weight of the flame retardant additive composition.

Component (c) of the compositions of the present invention is magnesium hydroxide or $Mg(OH)_2$. Magnesium hydroxide is well described in the literature. See, *Modern Plastics Encyclopedia* '89, McGraw Hill, Mid-October Issue, pp. 162–64. Magnesium hydroxide is commercially available, e.g., "VERSAMAG UF" from Morton International Company. Preferably, the flame retardant additive compositions of the present invention comprise from about 40 to about 96 percent by weight of the magnesium hydroxide, and more preferably from about 70 to about 96 percent by weight of the magnesium hydroxide based on the total weight of the flame retardant additive composition.

Optionally, the flame retardant additives of the present invention may also comprise (d) a Group IIA metal organic compound or salt. Preferred are Group IIA metal carboxylic acid salts containing at least six carbon atoms. Although magnesium compounds are the preferred Group IIA metal, calcium, barium and strontium compounds are also within the scope of the present invention.

Among the contemplated carboxylic acids from which salts of the Group IIA alkaline-earth metals can be derived, it is believed that approximately at least six carbon atoms are required to effectively disperse the Group IIA metal in the silicone resin. It is contemplated that while little advantage would be found by utilizing carboxylic acid salts containing more than about 20 carbon atoms, such salts may well be useful in specific applications. It is to be noted that it is not presently felt that finely divided Group IIA metal per se would be an effective ingredient in the flame retardant additive compositions of the present invention. However, it may be possible that such effective Group IIA metal additives could be effectively complexed with other organic moieties, and therefore find effective use in such compositions by virtue of their ability to readily disperse throughout the silicone resin. It is therefore intended that the Group IIA metal salt represent not only those effective Group IIA metal carboxylic acid salts as described, but also such other organic complexes of such metals as are effective for use in such flame retardant applications. Metal salts of other materials may be equally effective. Salts of the following acids may be suitable: sulfinic, sulfonic, aromatic sulfenic, sulfamic, phosphinic and phosphoric acids. Included within the Group IIA metal carboxylic acid salts which can be employed in the practice of the present invention are, for example, magnesium stearate, calcium stearate, barium stearate and strontium stearate. The carboxylic acid salts include: stearates, isostearates, oleates, palmitates, myristates, laurates, undecylenates, 2-ethylhexanoates, hexanoates, etc.

Preferably the flame retardant additive compositions of the present invention comprise from about 1 to about 10 percent by weight of the Group IIA metal organic salt (d) based on the total weight of the flame retardant additive composition.

The present invention is also directed to novel thermoplastic resin compositions having mixed therein the flame retardant additive compositions of the present invention. Included among the thermoplastic resins which can be used to make the flame retardant compositions of the present invention are, for example, polyolefins such as low density polyethylene, high density polyethylene, polypropylene, polybutylene, etc., and copolymers of these; crystal and high impact polystyrene; polycarbonates such as "LEXAN" brand from General Electric Company; polyesters such as "VALOX" brand resins manufactured by General Electric Company; polyamides such as nylons; polycaprolactams; ionomers; polyurethanes; co- and ter-polymers of acrylonitrile, butadiene and styrene; acrylic polymers; acetal resins; ethylene-vinyl acetate; polymethylpentene; flexible polyvinylchloride; polyphenylene oxide; and polyphenylene oxide-polystyrene blends or copolymers such as "NORYL" resins from General Electric Company.

In preferred embodiments, the flame retardant compositions of the present invention comprise (A) from about 30 to about 90 percent by weight, more preferably from about 45 to about 85 percent by weight, of a thermoplastic resin based on the total weight of the flame retardant composition; and (B) from about 70 to about 10 percent by weight, more preferably from about 55 to about 15 percent of the flame retardant additives of the present invention, based on the total weight of the flame retardant composition.

In other preferred embodiments, the compositions of the present invention may comprise additional optional ingredients, such as organic halides. An example of such an organic halide is decabromodiphenyl oxide. Another is Dechlorane Plus, a chlorinated alicyclic hydrocarbon available from Occidental Chemical Corporation. Another effective, yet optional ingredient is aluminum trihydrate, such as Micral 855 from Solem Industries. Those skilled in the art will recognize the temperature constraints of aluminum trihydrate.

Further, although one of the objects of the present invention is to avoid the use of antimony metal, it is contemplated herein that certain thermoplastic formulations may nonetheless contain 1 to 10 percent by weight of antimony oxide as an additional optional component, should it be so desired.

Additionally, the compositions of the present invention may contain various fillers, including but not limited to talc, clay, wollastonite, calcium carbonate, additional aluminum trihydrate etc. It is contemplated that excessive amounts of such fillers could have deleterious effects on flame retardancy and individual formulations can be adjusted for particular filler loadings.

In the practice of the present invention, the flame retardant compositions can be made by mixing together the organic polymer with the silicone oil, the silicone resin, the magnesium hydroxide, and, optionally, the Group IIA metal organic salt, hereinafter referred to as the "Group IIA salt" by means of known conventional compounding or blending apparati, such as a Banbury mixer, a 2-roll rubber mill or a twin screw extruder. Order of addition of the particular composition constituents does not appear to be critical; and, those skilled in the art will be able to prepare the flame retardant compositions contemplated herein without undue experimentation.

A preferred method of providing the flame retardant thermoplastic compositions of the present invention is to premix the silicone component with the MQ resin solution, and thereafter remove the solvent as by distillation, thereby ensuring complete dispersion of the resin in the oil. This solution is thereafter combined with the remaining ingredients by any suitable means for providing a substantially homogeneous composition (e.g. twin screw extrusion).

The proportions of the various ingredients can vary widely depending upon the particular application intended. For example, effective flame retardance can be achieved within the ranges of materials discussed above. However, greater or smaller amounts may suffice in particular applications. Reinforcing and nonreinforcing fillers may also be employed, such as those mentioned above, for inclusion in the formulations of the present invention as well as other additives without departing from the practice of the invention. Flame retardant thermoplastics can contain such fillers in an amount of, approximately, 5 to 70 percent by weight of the total composition.

The flame retardant composition of the present invention can be extruded onto a conductor such as copper wire and the like, and in particular instances it can be crosslinked depending on whether an organic peroxide curing agent is present. Of course, there are numerous other applications where the flame retardant compositions of the present invention may be used to great advantage. Such flame retardant thermoplastic materials may be successfully injection molded, extruded or compressed, etc. to form numerous useful products such as moldings, sheets, webbings and a multitude of other flame retardant thermoplastic products. Thus, the flame retardant compositions of the present invention also can be utilized in such applications as appliance housings, hairdryers, television cabinets, smoke detectors, automotive interiors, fans, motors, electrical components, coffee makers, pump housings, power tools etc.

Those skilled in the art will appreciate that there are several methods for testing and comparing relative flame retardancy of thermoplastics. Among the most well known are limiting oxygen index, horizontal burn times (HBT) and vertical burn times (VBT). Underwriters' Laboratories, Inc. UL-94 describes a "Standard For Test For Flammability Of Plastic Materials For Parts In Devices And Appliances" (hereinafter referred to as UL-94).

In accordance with this test procedure, materials so investigated are rated either UL-94 V-0, UL-94 V-1, or UL-94 V-2 based on the results of five specimens. The criteria for each V rating per UL-94 is briefly as follows: "UL-94 V-0": average flaming and/or glowing after removal of the igniting flame shall not exceed 10 seconds after either of two applications of the test flame and none of the specimens shall drip particles which ignite absorbent cotton. "UL-94 V-1": average flaming and/or glowing after removal of the igniting flame shall not exceed 30 seconds after either of two applications of the test flame and none of the specimens shall drip particles which ignite absorbent cotton. "UL-94 V-2": average flaming and/or glowing after removal of the igniting flame shall not exceed 30 seconds after either of two applications of the test flame and the specimens may be permitted to drip flaming particles which ignite absorbent cotton placed 12 inches below the test specimen.

The criteria for 94HB rating according to the UL94 Horizontal Burning Test for classifying materials is briefly as follows: HB) not have a burning rate exceeding 1.5 inches per minute over 3.0 inch span or sample must cease to burn before the 4.0 inch reference mark on the sample specimen.

DESCRIPTION OF THE PREFERRED EMBODIMENTS

The following examples illustrate the present invention but are not intended to limit the subject matter of the appended claims in any manner whatsoever.

EXAMPLES 1-2

Blend 1—A blend of 25 pounds of magnesium hydroxide ("VERSAMAG UF", available from Morton International Company) and 8.3 pounds SFR100 additive (a high viscosity blend of MQ resin and silanol stopped methyl polymer available from General Electric Company) were mixed in a 25 liter DRAIS blender. The batch was run at 107 rpm for 3 hours with the side mounted chopper blades on. After 3 hours, the product could be easily removed from the DRAIS blender as a free flowing powder. The bulk density of the powder was increased to 45.61 lbs/ft$^3$ from 21.8 lbs/ft$^3$ for pure "VERSAMAG UF".

The blend was then melt extruded in polypropylene by extruding in a twin screw corotating extruder at a melt temperature of 200° to 230° C. It was found to be preferable to add the SFR 100 additive via the powdered flame retardant due to the ease of powder feed. It has been noted that many thermoplastic olefins manufacturers prefer powdered additives over high viscosity liquid additives as the production feed systems are designed to handle powdered additives. An additional blend was also prepared with magnesium stearate added.

For comparative purposes, magnesium hydroxide/polypropylene blends with and without magnesium stearate added were also prepared.

Blend 2—A first comparative blend (A*) was formulated with 35 percent by weight J. M. Huber Corp. aluminum trihydrate and 65 percent by weight SFR100 additive.

Blend 3—Comparative examples B* was formulated by adding additional aluminum trihydrate ("MICRAL 855", available from Solem Industries) to blend A* to obtain 75 percent by weight aluminum trihydrate and 25 percent by weight SFR100 additive.

The compositional data, along with flame retardance and Dynatup Impact Performance results are set forth below in Table 1. Also included are data for Comparative Example C* having SFR100 additive and magnesium stearate but no magnesium hydroxide; and Comparative Example D* which is polypropylene only.

TABLE 1

| Example | 1 | 2 | A* | B* | C* | D* |
|---|---|---|---|---|---|---|
| Composition, phr | | | | | | |
| Polypropylene | 100 | 100 | 100 | 100 | 100 | 100 |
| Blend 1 (75 pbw MgOH$_2^a$ 25 pbw SFR100$^b$) | 100 | 100 | — | — | — | — |
| Blend 2 (35 pbw ATH 65 pbw SFR100$^b$) | — | — | 38.5 | — | — | — |
| Blend 3 (75 pbw ATH 25 pbw SFR100$^b$) | — | — | — | 100 | — | — |
| SFR 100$^b$ | — | — | — | — | 25 | — |
| Mg Stearate | — | 4 | 4 | 4 | 4 | — |
| Properties | | | | | | |
| FR Rating$^c$ | HB | HB | HB | HB | VI | X |
| Rate of Burn, in/min | 0.9 | 0.7 | 0.8 | 0.9 | — | >1.5 |
| Gardner Impact$^d$ | 29.2 | 29.6 | 21.2 | — | 22.0 | 20.0 |

*Comparative Example
$^a$"VERSAMAG UF", Morton International Company
$^b$high viscosity blend of MQ resin and silanol stopped methyl polymer, General Electric Company, GE Silicones
$^c$UL94 Horizontal Burn rating
$^d$in-lbs at 25° C.
X consume

EXAMPLES 3-7

Compounds were melt extruded by feeding solid components to the main feed throat of a twin screw corotating extruder with downstream injection of the high viscosity SFR 100 additive. It was observed that the magnesium hydroxide containing compounds had improved processability over compounds employing other nonhalogenated flame retardant additives which tended to foam, such as aluminum polyphosphate and aluminum trihydrate. It was possible to feed the magnesium hydroxide into the main feed throat of the extruder along with the polypropylene at compounding temperatures of 230° C. with no visible foaming of the extrudate. Addition of ammonium polyphosphate or aluminum trihydrate at the main feed throat caused slight foaming at these compounding temperatures. It is believed, although Applicant does not wish to be bound by any particular theory, that the improved processability is due to the higher decomposition temperature of magnesium hydroxide, 350° C., compared to that of other nonhalogenated flame retardants which generally decompose below about 230° C.

Further it was observed that when magnesium hydroxide is used with polypropylene alone, without the silicone components, it has been found to have deleterious effects on the process compounding and on the final physical properties.

These formulations meet the Horizontal Burning Test for Classifying Materials 94HB, and were not found to meet the criteria for Vertical Burning Test for Classifying Materials 94V-0, 94V-1, or 94V-2 according to Underwriter's Laboratory Bulletin UL94. The results of the flame retardance and impact resistance of these formulations are presented in Table 2. From Table 2 it can easily be seen that the compositions of the present invention containing magnesium hydroxide and silicone/silicone resin components showed marked improvement in impact strength over compositions without the silicone/silicone resin. This significant increase in impact strength is further demonstrated in FIGS. 1 and 2.

TABLE 2

| Example | 3 | 3A* | 4 | 4A* | 5 | 5A* | 6 | 6A* | 7 | 7A* |
|---|---|---|---|---|---|---|---|---|---|---|
| Composition, phr | | | | | | | | | | |
| Polypropylene[a] | 100 | 100 | 100 | 100 | 100 | 100 | 100 | 100 | 100 | 100 |
| Mg(OH)$_2$[b] | 25 | 25 | 48 | 48 | 24 | 24 | 50 | 50 | — | 40 |
| Mg Stearate | — | — | 2 | 2 | 1 | 1 | — | — | 4 | 4 |
| SFR 100[c] | 8 | — | 8 | — | 8 | — | 8 | — | 25 | 25 |
| ATH | — | — | — | — | — | — | — | — | 40 | — |
| Properties | | | | | | | | | | |
| Impact Resistance[d] | | | | | | | | | | |
| Maximum Load, lbs | 240.5 | 141.4 | 221.6 | 199.7 | 447.2 | 147.8 | 282.1 | 167.2 | 347.1 | — |
| Total Energy, ft-lbs | 8.1 | 4.0 | 9.5 | 5.9 | 11.7 | 8.1 | 8.5 | 3.9 | 9.8 | — |
| Flame Retardance[e] | | | | | | | | | | |
| Rate of Burn, in/min | — | — | — | — | — | — | — | — | 0.4 | 0.4 |
| FR Rating | HB | HB | HB | HB | HB | HB | HB | HB | HB | HB |
| Gardner Impact[f] | 22.0 | 10.8 | — | 13.0 | 23.6 | 11.6 | 22.8 | 10.0 | 60.0 | 60.0 |

*Comparative Example
[a]"PROFAX 6523", Himont USA. Inc.
[b]"VERSAMAG UF", Morton International Company
[c]high viscosity blend of MQ resin and silanol stopped methyl polymer, General Electric Company, GE Silicones
[d]Dynatup Impact Performance Test
[e]Underwriters Laboratories UL94
[f]In-lbs at 25° C.

The above-mentioned patents and test methods are hereby incorporated by reference.

Many variations of the present invention will suggest themselves to those skilled in the art in light of the above detailed description. The flame retardant additives can be employed with a wide variety of normally flammable thermoplastic resins, such as polyethylene, polyesters, polycarbonates, polyphenylene ethers and polyamides. Further, a wide variety of silicones and silicone resins can be employed in preparing the flame retardant additives of the present invention. It is also contemplated to employ a wide range of Group IIA metal organic salts in the practice of the present invention, including but not limited to calcium stearate, barium stearate, strontium stearate, calcium isostearate, magnesium oleate, barium palmitate, magnesium myristate and calcium laurate. All such obvious modifications are within the full intended scope of the appended claims.

I claim:

1. A flame retardant thermoplastic composition comprising:
   (A) from about 30 to about 90 percent by weight of a normally flammable thermoplastic resin based on the total weight of said flame retardant composition; and
   (B) from about 70 to about 10 percent by weight of a flame retardant additive composition in powder form based on the total weight of said flame retardant composition prepared by blending
      (a) from about 2 to about 40 percent by weight of a silicone oil based on the total weight of said additive composition (B);
      (b) from about 1 to about 20 percent by weight of a silicone resin soluble in said silicone oil (a) based on the total weight of said additive composition (B); and
      (c) from about 40 to about 96 percent by weight of magnesium hydroxide based on the total weight of said additive composition (B) until a flowable powder is formed.

2. A composition as defined in claim 1, wherein said thermoplastic resin (A) is selected from the group consisting of polypropylene, polyethylene, polycarbonate, crystalline polystyrene, high impact modified polystyrene, acrylonitrile-butadiene-styrene terpolymer, polyphenylene oxide-polystyrene blends, acrylic polymer, polyurethane, polyamides and mixtures of any of the foregoing.

3. A composition as defined in claim 2, wherein said thermoplastic resin (A) comprises polypropylene.

4. A composition as defined in claim 3, wherein said thermoplastic resin (A) is present in an amount ranging from about 45 to about 85 percent by weight based on the total weight of the composition.

5. A composition as defined in claim 1, wherein said flame retardant additive (B) further comprises:
   (d) a Group IIA metal organic salt.

6. A composition as defined in claim 5, wherein said Group IIA metal organic salt (B)(d) is a Group IIA metal carboxylic acid salt containing at least 6 carbon atoms.

7. A composition as defined in claim 6, wherein said Group IIA metal is selected from the group consisting of magnesium, calcium, barium and strontium.

8. A composition as defined in claim 6, wherein said carboxylic acid salt is selected from the group consisting of stearates, oleates, palmitates, myristates, laurates, undecylenates, 2-ethylhexanoates and hexanoates.

9. A composition as defined in claim 5, wherein said Group IIA metal organic salt (B)(d) is present in an amount ranging from about 1 to about 10 percent by weight based on the total weight of the additive composition (B).

10. A composition as defined in claim 9, wherein said Group IIA metal organic salt (B)(d) is present in an amount ranging from about 1 to about 5 percent by weight based on the total weight of the additive composition (B).

11. A composition as defined in claim 1, wherein said silicone (B)(a) is an organopolysiloxane comprised of chemically combined siloxy units selected from the group consisting of $R_3SiO_{0.5}$, $R_2SiO$, $RSiO_{1.5}$, $R^1R_2SiO_{0.5}$, $RR^1SiO$, $(R^1)_2SiO$, $R^1SiO_{1.5}$ and $SiO_2$ units and mixtures thereof wherein each R represents independently a saturated or unsaturated monovalent hydrocarbon radical, $R^1$ represents independently a saturated or unsaturated monovalent hydrocarbon radical or a radical selected from the group consisting of a hydrogen atom, hydroxyl, alkoxyl, aryl, vinyl, or allyl radicals and wherein said organopolysiloxane has a viscosity of, approximately, 600 to 300,000,000 centipoise at 25° C.

12. A composition as defined in claim 11, wherein said silicone (B)(a) is an essentially linear polydimethylsiloxane copolymer having a viscosity of 90,000 to 150,000 at 25° C.

13. A composition as defined in claim 1, wherein said silicone (B)(a) is present in an amount ranging from about 2 to about 40 percent by weight based on the total weight of the additive composition (B).

14. A composition as defined in claim 1, wherein said silicone resin (B)(b) is an MQ silicone resin comprised of monofunctional M units of the average formula $R_3SiO_{0.5}$ and tetrafunctional Q units of the average formula $SiO_2$, and having an average ratio of, approximately, 0.3 to 4.0M units per Q unit.

15. A composition as defined in claim 1, wherein said silicone resin (B)(b) is present in an amount ranging from about 1 to about 20 percent by weight based on the total weight of the additive composition (B).

16. A composition as defined in claim 1, wherein said silicone (B)(a) is an essentially linear polydimethylsiloxane copolymer having a viscosity of 90,000 to 150,000 at 25° C., and said silicone resin (B)(b) is an MQ silicone resin comprised of monofunctional M units of the average formula $R_3SiO_{0.5}$ and tetrafunctional Q units of the average formula $SiO_2$, and having an average ratio of, approximately, 0.3 to 4.0M units per Q unit.

17. A composition as defined in claim 5, wherein said thermoplastic resin (A) comprises polypropylene; said silicone (B)(a) is an essentially linear polydimethylsiloxane copolymer having a viscosity of 90,000 to 150,000 at 25° C.; said silicone resin (B)(b) is an MQ silicone resin comprised of monofunctional M units of the average formula $R_3SiO_{0.5}$ and tetrafunctional Q units of the average formula $SiO_2$, and having an average ratio of, approximately, 0.3 to 4.0M units per Q unit; and said Group IIA metal organic salt (B)(d) comprises magnesium stearate.

18. A flame retardant additive composition consisting essentially of: (A) from about 45 to about 85 percent by weight of a normally flammable thermoplastic and (B) from about 55 to about 15 percent by weight of a flame retardant additive in powder form prepared by blending (a) an essentially linear polydimethylsiloxane copolymer having a viscosity of 90,000 to 150,000 at 25° C.; (b) an MQ silicone resin comprised of monofunctional M units of the average formula $R_3SiO_{0.5}$ and tetrafunctional Q units of the average formula $SiO_2$, and having an average ratio of, approximately, 0.3 to 4.0M units per Q unit; and (c) magnesium hydroxide until a flowable powder is formed.

19. A method for preparing a flame retardant thermoplastic composition comprising the steps of blending
(a) from about 2 to about 40 parts by weight of a silicone oil;
(b) from about 1 to about 20 parts by weight of a silicone resin soluble in said silicone oil (a); and
(c) from about 40 to about 96 parts by weight of magnesium hydroxide until a flowable powder is formed and combining from about 70 to about 10 percent by weight based on the total weight of said flame retardant additive composition of said free flowing powder with from about 30 to about 90 percent by weight based on the total weight of said flame retardant composition of normally flammable thermoplastic resin to disperse said free flowing powder throughout said thermoplastic resin.

20. A method as defined in claim 19 wherein said thermoplastic resin (A) is present in an amount ranging from about 45 to about 85 percent by weight based on the total weight of said flame retardant composition; said silicone oil (B)(a) is present in an amount ranging from about 2 to about 20 percent by weight based on the weight of said additive composition (B); said silicone resin (B)(b) is present in an amount ranging from about 1 to about 10 percent by weight based on the weight of said additive composition (B); and said magnesium hydroxide (B)(c) is present in an amount ranging from about 70 to about 96 percent by weight based on the total weight of said additive composition (B).

21. A method as defined in claim 19, wherein said silicone (B)(a) is an organopolysiloxane comprised of chemically combined siloxy units selected from the group consisting of $R_3SiO_{0.5}$, $R_2SiO$, $RSiO_{1.5}$, $R^1R_2SiO_{0.5}$, $RR^1SiO$, $(R^1)_2SiO$, $R^1SiO_{1.5}$ and $SiO_2$ units and mixtures thereof wherein each R represents independently a saturated and unsaturated monovalent hydrocarbon radical, $R^1$ represents independently a saturated or unsaturated monovalent hydrocarbon radical or a radical selected from the group consisting of a hydrogen atom, hydroxyl, alkoxyl, aryl, vinyl, or allyl radicals and wherein said organopolysiloxane has a viscosity of approximately 600 to 300,000,000 centipoise at 25° C.

22. A method as defined in claim 21, wherein said silicone (B)(a) comprises an essentially linear polydimethylsiloxane copolymer having a viscosity of 90,000 to 150,000 centipoise at 25° C.

23. A method as defined in claim 19, wherein said silicone resin (B)(b) comprises an MQ silicone resin comprised of monofunctional M units of the average formula $R_3SiO_{0.5}$ and tetrafunctional Q units of the average formula $SiO_2$, and having an average ratio of approximately, 0.3 to 4.0M units per Q unit.

24. A process as defined in claim 23, wherein said silicone resin (B)(b) comprises polytrimethylsilyl silicate having a ratio of approximately 0.6 to 2M units per Q unit.

25. A method as defined in claim 19, wherein said thermoplastic resin (A) is selected from the group consisting of polypropylene, polyethylene, polycarbonate, crystalline polystyrene, high impact polystyrene, acrylonitrile-butadiene-styrene terpolymer, polyphenylene oxide-polystyrene blends, acrylic polymers, polyurethane, polyamides and mixtures of any of the foregoing.

26. A method as defined in claim 25, wherein said thermoplastic resin (A) comprises polypropylene.

27. A method as defined in claim 19 further comprising adding (B)(d) from about 1 to about 10 percent by weight based on the total weight of said additive composition (B) of a Group IIA metal organic salt.

28. A method as defined in claim 27, wherein said Group IIA metal organic salt (B)(d) comprises a Group IIA metal carboxylic acid salt containing at least 6 carbon atoms.

29. A method as defined in claim 28, wherein said Group IIA metal is selected from the group consisting of magnesium, calcium, barium and strontium.

30. A method as defined in claim 28, wherein said carboxylic acid salt is selected from the group consisting of stearates, oleates, palmitates, myristates, laurates, undecylenates, 2-ethylhexanoates and hexanoates.

31. A method as defined in claim 28, wherein said Group IIA metal organic salt (B)(d) comprises magnesium stearate.

32. A method as defined in claim 20 further comprising the step (C) comprising forming the flame retardant composition of steps (A) and (B).

33. A method as defined in claim 32 wherein said forming step (C) comprises molding, extruding or pultruding.

34. An article of manufacture produced by the method of claim 32.

35. An article of manufacture as defined in claim 34 which is a filament, fiber, film, web, fabric, sheet, molded part, extruded part, pultruded part or coating.

36. A composition of claim 18 which further comprises magnesium stearate.

* * * * *